United States Patent [19]

Held

[11] Patent Number: 4,557,778

[45] Date of Patent: Dec. 10, 1985

[54] METHOD AND APPARATUS FOR MANUFACTURING COMPRESSED MATERIALS HAVING TEXTURED SURFACES

[76] Inventor: Kurt Held, Alte Strasse 1, D-7218 Trossingen 2, Fed. Rep. of Germany

[21] Appl. No.: 561,690

[22] Filed: Dec. 15, 1983

[30] Foreign Application Priority Data

Dec. 21, 1982 [DE] Fed. Rep. of Germany ..... 32471467

[51] Int. Cl.⁴ ............................................. B32B 31/12
[52] U.S. Cl. .................... 156/209; 156/324; 156/344; 264/284; 425/115
[58] Field of Search ............... 156/209, 219, 324, 344, 156/543; 162/348; 264/166, 284, 243; 425/115

[56] References Cited

U.S. PATENT DOCUMENTS

| | | | |
|---|---|---|---|
| 3,267,191 | 5/1966 | Williams et al. | 264/166 |
| 3,769,129 | 10/1973 | Williams | 156/209 |
| 3,929,545 | 12/1975 | Van Dyck et al. | 156/220 |

FOREIGN PATENT DOCUMENTS

| | | |
|---|---|---|
| 1997902 | 8/1968 | Fed. Rep. of Germany . |
| 2300680 | 7/1973 | Fed. Rep. of Germany . |
| 2425240 | 5/1975 | Fed. Rep. of Germany . |
| 2421086 | 11/1975 | Fed. Rep. of Germany . |
| 2552547 | 5/1977 | Fed. Rep. of Germany . |
| 2603414 | 8/1977 | Fed. Rep. of Germany . |
| 2852615 | 10/1979 | Fed. Rep. of Germany . |
| 7935483 | 3/1980 | Fed. Rep. of Germany . |

Primary Examiner—Robert A. Dawson
Attorney, Agent, or Firm—Toren, McGeady, Stanger, Goldberg & Kiel

[57] ABSTRACT

In the continuous production of laminates having a texture embossed onto the surface thereof, a pair of resin treated layered webs are brought together at equal speed and an embossed carrier member having a negative of the texture to be embossed thereon is fed between the webs while being unwound from a supply roll. The layered structure formed of the two webs and the carrier member is subjected to compression with subsequent cooling whereupon the outer sides of the laminates are roughened and the webs are formed with a positively embossed or textured surface and are detached from the carrier member and wound on rolls or cut into panels and stacked while the carrier member is simultaneously taken up upon a takeup roll or the like. The carrier member may be moved independently of the webs, i.e., in a reverse direction and the apparatus for manufacturing the webs with the embossed surfaces may comprise a continuously operating double belt press, a spray water cooling system, a grinding station, an unwinding unit with supply rolls, a winding station with rolls, a panel cutting station, a control cabinet having a data terminal and a texturing system consisting of the carrier member, embossing foil rolls and an embossing foil takeup coil.

20 Claims, 2 Drawing Figures

METHOD AND APPARATUS FOR MANUFACTURING COMPRESSED MATERIALS HAVING TEXTURED SURFACES

The present invention relates generally to the manufacture of laminates and more specifically to a continuous production process for forming laminate materials having a texture embossed into the surface thereof.

In the design of living interiors, as well as in the manufacture of furniture and in the construction of vehicles, hard fiber boards, wood fiber boards, glass fiber boards, and the like having a decorative surface layer thereon have been utilized for some time. Such materials are especially advantageous in the applications set forth above because they not only function as structural or construction materials, but because they are already provided in their initial form with a finished surface having a special hardness, scratch and abrasion resistance and stability to chemicals while, at the same time, being decorative in appearance. In products presently on the market, the surface layer generally consists of a laminate which, in turn, comprises several layers of resin impregnated paper.

Such laminates are normally formed in the core by a number of layers of phenol resin impregnated thick papers. A barrier film is provided thereon which is useful to prevent the phenol layer from shining through or creating an unduly glossy effect. Over this there is provided a decorative film which, for protection, is ultimately sealed off by the resin-containing and thus transparent overlaid film. The outer papers of the surface layer are impregnated with melamine resins which have high stability to water and great hardness. The external layer or skin of pure resin provides a surface seal which, in turn, creates characteristics of chemical stability and low water absorption.

To an increasing degree, purchasers of this type of product have demanded that such products be made available with textures having a greater variety of patterns embossed on the surfaces thereof. These patterns may consist, for example, of nubby patterns, flutings, geometric ornamentation, fine grain textures as well as wood grain imitation. The texturing is generally accomplished by means of embossing tools during the manufacture of the panels or laminates.

In the prior art, essentially two methods have been in general use for production of such panels or laminates.

In the first such method, paper layers impregnated with precondensation products, such as melamine resins, which are dried, are placed on the surface which is to be converted and they are pressed on by the application of heat and pressure. In the manufacture of chip boards having a decorative surface layer thereon, it has been attempted to effect the pressing of the chip board and the application of the surface layer in one operation by scattering the chip cake onto the paper layer and subsequently pressing it together with resin paper during the application of heat.

In the second method, impregnated paper film is pressed in several layers while being heated in order to form an impressed laminate board which, in a second operation, is glued onto the surface which is to be converted or treated.

Although the second method described above seems more complicated than the first, it has become more important since it offers major advantages. The first method tends to be limited due to the sensitivity of wood material to pressure. Where scratch resistance and hardness are concerned, the resulting surface does not fulfill the same requirements as a compressed laminate board. Water needed for the production of chip boards causes swelling of the chip and because of the lack of uniformity of the chips which are used, there tends to occur different swelling effects and hence an uneven surface of the chip board and of the converted surface. Correction of the surface by regrinding is not a practical solution and thus grinding to correct the surface cannot be relied upon. Furthermore, water vapor forming in the chip board through the action of heat may escape through the surface and this may lead to blistering and creation of fissures in the plastic surface. Accordingly, the resulting chip board product could become unusable.

The second method avoids many of these disadvantages due to the fact that the manufacturing procedure is divided into two operations. Another advantage which has been found is that due to the use of thin laminates, the production of round edges becomes possible whereby safety requirements particularly in the construction of parts for vehicles and furniture, are more easily met, for example, in the manufacture of parts for nursery rooms. Because of these advantages, the demand for textured laminate boards continuously increases.

The manufacturing process for the production of laminate press boards involves the utilization of binder-impregnated paper webs which are laid out or stacked in a number of layers depending upon the thickness of the board to be manufactured. Thereafter, a high-pressure pressing process occurs which bonds the papers together to form the board. Finally, a trimming operation is performed and the press edges are removed from the resin treated paper hardened without pressure. Usually, a roughening of the back of the laminates is thereafter effected on a grinding machine in order to enable them to be adhered or glued. For carrying out the compressing operation, there is utilized intermittent and continuous methods.

In the intermittent methods, the resin impregnated and precondensed paper films are stacked to form packets which are covered with press plates which possess a negative texture corresponding to a desired pattern to be produced. Several of these packets are then pressed in a one-day light press to laminate boards having the desired surface embossing (see German Pat. No. 24 66 16). The embossing may easily be changed by changing the type or press plates which are utilized. Because of the mode of operation of single-daylight presses, it is evident that the laminate boards have a maximum length with the result that waste generally occurs in the processing. Moreover, storage of such large-area laminate boards presents problems because of space requirements and because of possible warping of the boards. Since the impregnated paper webs are usually supplied on rolls, a continuous manufacturing process may be suitably utilized. In the case of thin laminate boards, it is further possible to roll such boards after manufacture thereby greatly simplifying the storage and processing of the boards.

In situations involving continuous manufacture of laminates without surface texturing, machines are available wherein the laminate is pressed between two belts which revolve in opposite directions. In order to provide a textured surface in such laminates, it has been considered appropriate to utilize in such machines an embossing belt which is structured with the negative of the pattern which is desired. One state of the art technique for making such an embossing belt involves an etching process. However, due to the fact that the embossing belt must be in the form of an endless belt, and since as a result thereof a diagonal or transversely extending weld seam must be formed, difficulties arise in the utilization of such a belt since the alteration of the belt due to the welding seam causes disfigurement of the texture which is to be provided on the laminate. However, an electroplating technique has been used to avoid this difficulty wherein a metal layer is formed on the endless belt having a thickness which is greater than the depth of the etched engraving and wherein the negative texture is applied by etching only after the application of such a layer (see German Pat. No. 29 50 795). Paper-backed or aluminum-backed release papers on the laminate surface are also known.

However, this prior art solution gives rise to a disadvantage in that the production of a textured press belt for double belt presses involves rather high costs. Other disadvantages will be found in the use of an endless belt as an embossing tool. When changing the embossing or textured pattern for the laminate boards, the entire embossing belt must be changed and this causes the necessity for stopping production. The machine must be opened and the embossing belt changed after which the machine must be reheated before production can be again resumed. Change of surface thus causes increased costs due to lost production time as well as the requirement for additional setup time. Furthermore, it is practically impossible to maintain a variety of different embossing patterns in stock due to the high investment expense involved for the embossing belt. Thus, flexible techniques for dealing with differing market situations becomes impossible for the reasons stated. Thus, advantages of a continuous manufacturing process, as compared to an intermittend process, are to some extent lost.

Accordingly, the present invention is directed toward the development of a continuous process for the production of laminates wherein a change of embossing or texturing motifs may be readily accomplished without substantial loss of time and energy and without requiring increased inventory of parts for different surface embossments. The invention is directed to a more simplified technique for producing laminates wherein market needs may be responded to more readily so that a continuous process for the production of laminates will exhibit economic advantages over intermittent processes. Furthermore, the invention is directed toward enabling approximately double the output of a continuous laminating machine which operates in accordance with the process of the invention, as compared with laminating machines in use at the present time, thereby achieving a further increase in the output of the continuous process.

SUMMARY OF THE INVENTION

Briefly, the present invention may be described as process for manufacturing laminate materials having embossed surfaces comprising the steps of: feeding together a pair of resin impregnated paper webs, feeding to between said webs a metallic carrier member having a hard wear resistant surface with an embossing pattern thereon to form a layered structure consisting of the carrier member with the webs on opposite sides thereof, compressing this layered structure while applying pressure and heat thereto, subsequently cooling the layered structure, roughening the outer sides of the paper webs and separating the paper webs from the carrier member, with the paper webs being either cut to size and stacked in panels or stored upon a takeup roll and with the metallic carrier member also being conveyed onto a takeup roll as it is separated from the paper webs.

As a result of the process of the invention, the embossing pattern is impressed on the paper webs. However, the carrier member may be utilized repeatedly or it may be positioned relative to the paper webs in order to enable change of the motif desired.

Thus, in accordance with the apparatus of the invention, there is provided means for moving the carrier member in one direction together with the paper webs and in a direction opposite thereto between the paper webs while the paper webs are separated therefrom and while pressing of the carrier member between the paper webs is not being performed in order to enable selective placement of the carrier member and of the embossing pattern thereon relative to the paper webs.

Accordingly, with the present invention, a continuous process for the production of laminate material having a textured surface may be provided wherein the layered resin treated webs are brought together at equal speed together with a metallic carrier member having a negative of the embossing pattern thereon, the carrier member being not less than 100 micrometers thick and being unwound from a supply roll. The carrier member may be provided with a hard, wear resistant surface and the layered structure including the paper webs and the carrier member is subjected to a cooling operation after the pressing together of the layered structure, with the backs of the laminates being roughened with diamond brushes during the manufacturing process.

Furthermore, in accordance with a further aspect of the present invention, carrier members may be selectively introduced between the paper webs in order to enable different motifs to be embossed on the paper webs during the production process.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
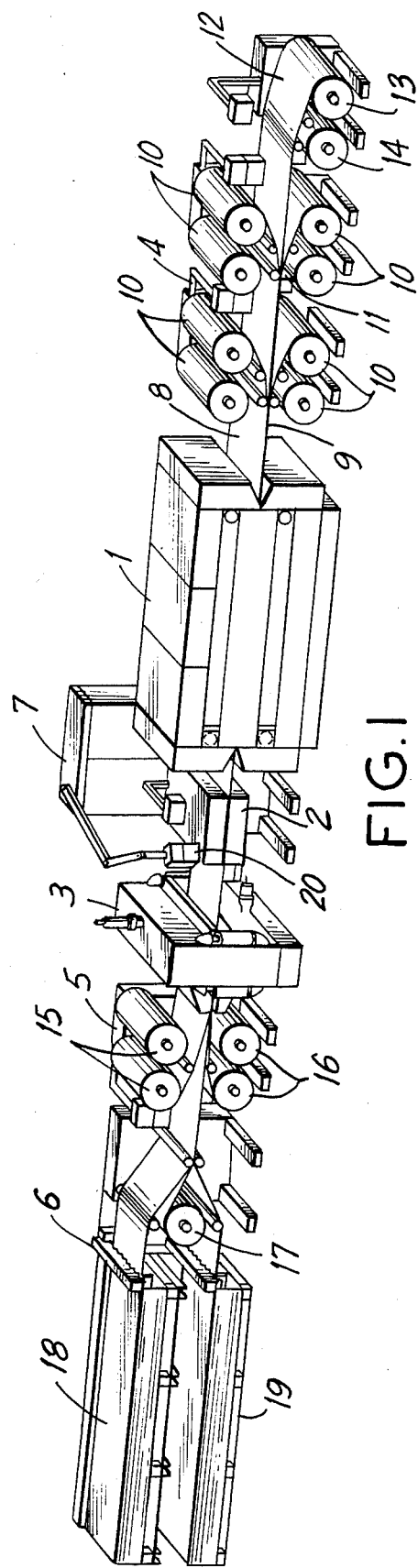
FIG. 1 is a perspective view of an apparatus in accordance with the invention.

Referring now to the drawing, there is shown an apparatus in accordance with the present invention which comprises a continuous laminating machine 1 wherein resin impregnated paper webs 8 and 9 are treated. The resin impregnated paper webs 8 and 9 are unwound from rolls 10 in accordance with the composition of the laminate and they are guided over guide rolls 11 into the continuous laminating machine 1. A textured carrier member 12 which unwinds from a roll 13 is inserted between the layered paper webs 8 and 9. The carrier member 12 may consist of a metal foil and the various types of carrier members which may be used and the method of making them will be discussed in more detail hereinafter. However, it will be appreciated that the member 12 will be textured with the desired embossing motif on both sides by one of the methods to be discussed hereinafter, for example, etching. If the motif of the embossment to be produced is to be changed or if the motif which is contained on the carrier member 12 which is unwound from the roll 12 is not desired, then in order to change the motif this can be accomplished simply by introducing a carrier member 12 from the roll 14 instead of from the roll 12.

The apparatus shown in FIG. 1 consists of a spray water cooling device 2, a grinding station 3, an unwinding unit 4 with supply rolls 10, a winding station 5 with rolls 15 and 16, a panel cutting station 6, a control cabinet 7 having a data terminal 20 and a texturing system formed of the carrier member 12 wound on the embossing foil rolls 13 and 14. Furthermore, an embossing foil takeup roll 17 is provided upon which the carrier member 12 may be wound at the completion of an operation.

In the laminating machine 1 which consists of a double belt press, the two layered paper webs 8 and 9 are hardened under heat and pressure in order to form a pair of laminate webs, the surfaces of which are separated by the embossing foil 12. The foil or carrier member 12 is formed with a negative pattern 21, as shown in FIG. 2, which is impressed into the surface of the respective laminate webs under pressure exerted by the press belts of the machine 1.

After leaving the machine 1, the two laminate webs pass through a cooling station 2 where they are sprayed with cooling spray water. They are then run through a grinding station 3 which is fitted with diamond brushes which may be equipped with a diamond-fitted round brush and, for example, a rubberized support roller or with two co-directionally rotating diamond-fitted round brushes. One or both of the external sides of the laminating webs are roughened with the brushes for better adhesion on the support material during gluing. Since the surface of the laminates rests upon the carrier member, it will not be damaged by the diamond brushes.

After passing through the grinding station 3, the laminate webs 8 and 9 may be separately wound on rolls 15 and 16 in the winding station 5 and the embossing foil or carrier member 12 is accommodated upon the separate takeup coil 17. As an alternative to winding of the laminate webs, they may be supplied to a cutting station 6 where they may be cut or divided into laminate panels 18 of a desired length. In order to enable easier transportation of the laminate panels, they are stacked on pallets 19.

Figure 2:
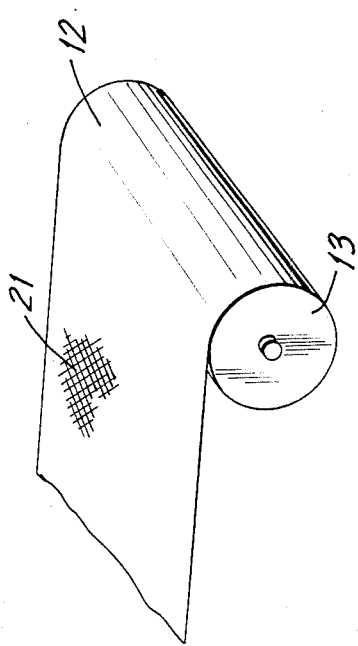
FIG. 2 is a perspective view showing in broken form the carrier member of the invention with the negative pattern thereon.

As shown in FIG. 2, the embossing foil 12 may be formed with various textures or motifs 21 as required. If it is desired to change the surface motif or texture for the laminate web, pressure is alleviated from the press belts of the laminating machine 1 and the embossing foil or carrier member 12 may be spooled forwardly or rearwardly between the rolls 13 and 17 until a desired pattern 21 has been appropriately located. After this, the press belts may be again pressurized and laminate production with the desired surface texture may continue. The process is automatically controlled from a control cabinet 7 and the parameters required for the production cycle are entered in the data terminal 20 which contains control equipment for operating the apparatus and for controlling the process parameters thereof.

In the formation of the carrier member 12, the surface texturization may be effected by means of a substantially metallic or duroplastic hard structure which may be brought to rest on the surface of the layered resin-treated paper webs during the practice of the process of the invention and which is pulled through the laminating machine at the same speed as the paper webs or laminates. The negative of the motif or embossing pattern which is formed on the carrier member is reproduced in positive form on the laminate surface by the pressure of endless belts in the laminating machine.

To simplify the handling of the various embossing structures needed for the production processes, the carrier member is unwound from a roll such as the rolls 13 and 14, prior to introduction into the laminating machine 1. The carrier member runs with the laminate webs through the machine and after separation from the laminates is rewound upon the takeup coil 17. In order to accelerate the change between different embossing motifs even further, the carrier member may possess, in accordance with a further development of the invention, several different embossing motifs in succession along the length thereof with the single length of each of the embossing motifs being selected in accordance with the length of the laminate web upon which the motif is to be produced. The carrier member 12 and the winding and unwinding devices therefor are designed so that they will permit forward and rearward winding of the carrier member so that the beginning of a desired embossing motif may be located at a desired position during the process of the invention.

Thus, it will be seen that in the practice of the invention, several advantages may be obtained in that a change in the embossing motif is made possible without requiring that the apparatus be shut down and without requiring opening of the laminating machine. This is accomplished by a simple forward or backward spooling of the carrier member 12 so that the desired textured or embossed surface pattern may be located as desired or by a simple exchange of the carrier member as, for example, by selective unwinding from either of the rolls 13 or 14. For this purpose, the laminating machine need not be turned off completely and it would suffice instead simply to remove the pressure from the endless belts. The loss of energy and production occurring in prior art devices through exchange of an embossing belt in a laminating machine is thus obviated. Since the carrier members can be wound on coils, maintaining a stock of carrier members is greatly simplified as compared with the use of bulky embossing belts. Furthermore, in prior art processes for the production of embossing belts from an endless belt, the existing weld seam must be coated by an expensive process. Since in the present invention the structure of the carrier member is not endless, but is instead wound on a coil or a roll, the requirement for a weld seam can be eliminated. Also, previous problems with seamless patterning of an endless belt no longer exists so that in the production of the textured carrier member there is involved much less expense. For these reasons, it is possible to maintain different textures or embossing patterns in readiness and thus to respond in a flexible manner to the requirements of the market.

The carrier member which unwinds from a coil or roll forwardly or upstream from the laminating machine runs together with the material which is to be laminated which consists of appropriately layered paper webs and which are likewise unwound from rolls and impregnated with precondensed resin between the endless belts of the machine and embosses the structure into the surface of the laminate by means of pressure exerted by the endless belts while the material being laminated hardens under the action of heat and pressure.

If the carrier member is textured or embossed on one side, it rests on the surface of the laminate web while the back of the carrier member rests on the press belt of a double belt press. Behind the machine, the laminate web and the carrier member are separately wound. If necessary, the laminate web can immediately be cut into boards or panels of required lengths.

If, on the other hand, the carrier member is textured on both sides, the laminate webs are layered so that their backs will lie on an endless belt while their top or upper surfaces lie on one side of the textured carrier member. Due to the fact that the carrier member lies therebetween, the laminates may be separated without difficulty after leaving the machine and there may be obtained approximately a doubling of the output of the laminates. The texturization of both sides of the carrier member can enable the production of different patterns so that two laminates with different embossing motifs can be continuously produced in one operation.

Utilizing this second method of the invention, efficiency can be further increased by a special aspect of the invention. In accordance therewith, the width of the carrier member may be reduced at least by twice the width of the press edge of the laminate and the carrier member can be enclosed between two laminate webs thereby making it possible to cool the double laminate web by spray water without fear of impairing the carrier member by the cooling water. As a result, higher temperatures can be utilized and applied in order to increase the running speed of the laminate web through the press or to obtain a shortened, cheaper model of the laminating machine. The back of the laminates can thereafter be roughened between diamond brushes in a grinding station in order to facilitate gluing or adhesion of the laminate on a support. The two laminates can then be separated by trimming of the press edge and wound on rolls or cut into panels of desired length and the carrier member may then be wound on a respective coil.

In both of the above-mentioned variations of the process of the invention, the carrier member may be divided into several sections of any desired length which will add up to exactly the total length of the carrier member. These sections may be provided with different embossing patterns so that change of the embossing motif is greatly facilitated. If a pattern change is desired, the press belts in the machine may be relieved of pressure and by utilizing two motors mounted at the winding stations the carrier member may be moved forwardly or rearwardly until the beginning of a desired pattern is reached. Thereafter, the pressure belts may be pressurized again and laminate production may continue. Naturally, this procedure may be carried out also by complete backwinding of the carrier member when the end thereof is reached. If an embossing motif is desired which is not on the carrier member which is then in use, the carrier member coil must be exchanged for one which contains the desired pattern. It should be noted here that again merely the press belts must be relieved of pressure but it is by no means necessary that the entire machine be turned off. The time for changing to another textured pattern or embossing motif is thus limited to a minimum of a few minutes and the loss of energy and time due to reheating of the machine is completely avoided.

The carrier members which are involved in the present invention may be formed with a textured or embossed pattern on one or on both sides thereof. Preparation or formation of a one-sided or two-sided textured or embossed carrier member consisting of two metal foils joined together with a thermostable duroplast adhesive layer may be effected with particular advantage in a double belt press itself. The foil adhesive packet together with accompanying webs such as parchment, vat paper, glass fiber mat, wire mesh, textile fabric on both outer sides of the carrier member to be produced is run through the reaction zone of the double belt press and simultaneously the metal foil surface is embossed against the adhesive film through the accompanying webs and hardened by supply heat. The embossed copper foil is then covered with a decorative-mat hard chrome layer and made wear resistant.

Carrier members for formation of the imitation of fabric, fiber and grain textures are obtained by pressing a fiber matrix with duroplastic, chemically or heat hardened binder between negatively embossed release papers, parchment, vat paper, glass fiber mat, wire mesh or textile fabric. The structure materials will then emboss their embossing motif into the surface of the fiber matrix. After the hardening of the duroplastic material, the textured materials which are placed on are removed and the surfaces are protected against wear by copper plating and decorative hard chrome plating, as is known for plastic surfaces. The duroplast laminate may then be used as the carrier member in the process of the present invention.

A carrier member 4 forming an imitation of a fabric or fiber pattern may be obtained by embedding an accompanying web between two webs of plastic metallic material such as, for example, a copper foil, an elastic layer, for example, a rubber layer or a plastic layer which may, for example, be soda kraft paper. The web may be a fabric layer of jute, textile fibers, parchment, vat paper, glass fiber mat, wire mesh or similar material. This intermediate layer impresses itself as a reproduction of its texture into elastic or plastic layer which rests as padding web against the press belts of the double belt press. The three layers are bonded together with a thermostable duroplast adhesive layer. Thereafter, the surfaces are hard chrome plated for wear protection. By the outer closed cover layer, effortless removal of the carrier from the laminate is made possible. This fabric structure on the laminates is suitable especially for work boards and embossed motifs used in kitchens.

A grain structure is obtained by substances which are scattered at random on a plastic metallic web provided with an adhesive layer. This web is covered with an additional plastic web so that the scattered substances are present between the two webs as an intermediate layer. These substances press themselves into the cover layers as elevations and by their scattered pattern form a grain structure. Such a texture or structure is especially suitable, for example, in the manufacture of table tops and cabinet doors.

One of the more versatile carrier members may be a metal foil or metal belt since it is durable and since its surface can be provided with any desired texture and hence all conceivable laminate embossing motifs can be created therewith. A preferable material for such a foil or belt is brass, nickel, copper, steel and the like which are examples of the materials which may be used. To increase surface hardness, the foil may be hard chrome plated after application of the texture.

Many possibilities exist for introducing the texture into the metal foil because of the plurality of machining possibilities of metal. Probably the simplest approach may be the grinding of the foil surface. The texture obtainable thereby is limited to a grinding trace structure.

A further possibility is thermal spraying of a suitable metal alloy onto the foil surface. In this approach, a metal wire or powder is melted in a spray flame, arc or plasma and the metal particles are thrown onto the surface to be coated by means of compressed air, propellant gas or plasma. Depending upon the method selected, the metal particles adhere by partial diffusion into the surface or by welding therewith. By appropriate guidance of a spray gun, a structure may be obtained on the foil surface which is suitable as an embossing structure for laminates. Advantageously there is selected for the coating an alloy which appropriately adheres on the foil material and which at the same time provides a good surface hardness. A fine or coarse grain structure may produce also by sand-jetting or by shot-peening the metal foil.

The texturing of the metal strip or metal foil surface may be effected in a manner known in the art by copying under pressure of a patterned drum or roller. There may be utilized for this technique a two-high rolling stand as is utilized in cold-rolling of strip. One of the working rollers, or both rollers, may carry a positive impression of the texture corresponding to the desired pattern and as the metal strip passes through the nip, they will emboss the respective negative pattern onto the metal surface of the carrier member. If both working rollers are textured, there may be obtained a two-sided carrier member. Otherwise, a one-sided member may be obtained. For the patterning of the drum or roller, it is preferable, for example, to utilize an engraving process by etching or a roll embossing process known from the printing art wherein a small roller corresponding to the negative pattern embosses the pattern into the roller under simultaneous revolving over the roller circumference in linear advance along a generatrix.

One of the most appropriate methods for structuring metal foil is effected by a known etching process because, in this manner, any desired pattern can be applied. In order to produce the etched engraving, many known methods are suitable such as, for example, photographic reproduction methods wherein a photosensitive layer is applied on the foil surface which subsequently is exposed through a negative representation of the pattern and is developed. The areas left standing protect the foil from the etch corrosion, while exposed areas are removed by the etchant to the desired depth. Other possible methods are, for example, imprinting of etch-resistant areas with print rollers, incomplete spraying on or washing on of such lacquers, or similar methods which permit a correct pattern covering against the attack of the etchants or an embossing/etching engraving where the foil surface is coated with a wax layer or a layer of similar properties into which a patterned roller impresses a pattern. The areas in the foil surface which are thereby bared of the wax are attacked by an etchant and eroded to the desired depth. By repeating the etching method several times, stepped depressions can be obtained which may serve to create interesting embossing motifs.

Another possible technique for making a metallic carrier member for utilization in the apparatus of the invention involves the electro-deposition of a metal, for example, nickel, on a positively textured substrate which may consist, for example, of a plastic, which is silver-plated to obtain the necessary conductivity. In accordance with the substrate texture, there is formed on the substrate a metal foil with the desired negative texture which, after the required layer thickness has been achieved, is detached from the substrate and then operates as the carrier member. If necessary, the metal foil may be hard chrome plated to increase surface hardness. It is particularly advantageous to select as a substrate instead of a plane surface, a patterned drum which is rotated in a plating bath at a rate depending upon the circumference, depth of immersion and rate of deposition of the metal on the drum. At an appropriately selected rotational speed, the metal foil deposited on the substrate will have the required layer thickness as it leaves the bath and may be detached continuously from the substrate.

Thus, it will be seen that, in accordance with the present invention, the carrier member may be formed to consist of a textured, duroplastic, thermostable laminate with or without metallic surface, structured metal foil or a structured metal strip. The carrier member may be produced by pressing a fiber matrix with duroplastic, chemically or heat hardening binder between negatively embossed release papers, parchment, vat paper, glass fiber mat, wire mesh or textile fabric and after hardening it may be protected against wear by copperplating and decorative hard chrome plating as for plastic surfaces.

The carrier member may also consist of an accompanying web inserted between two metallic layers, such as parchment, vat paper, glass fiber mat, wire mesh, textile fabric or of a metallic strip with an adhesive layer and substances strewn thereon and of a metallic cover layer for reproduction of fabric structures or elevations of the substances, the individual layers being joined together with a thermostable duroplast adhesive layer.

Furthermore, the carrier member which consists of two metallic layers joined together with a thermostable duroplast adhesive layer may be run as a foil-adhesive packet with placed-on accompanying webs, such as parchment, vat paper, glass fiber mesh, wire mesh or textile fabric into the reaction zone of a double belt press where the metal foil surface is embossed through the accompanying web against the adhesive film and the adhesive film is hardened by heating.

In accordance with the apparatus of the invention, the texturized or embossed area of the carrier member may be formed by grinding, sand-jetting, shot-peening, thermal spraying of a metal alloy, copying of a patterned roller or drum under pressure, etching, multistep etching and the like.

Furthermore, the carrier member may consist of a metal foil electro-deposited on a structured substrate which is detached from the substrate after the required layer of thickness has been reached.

For protection against wear, the surface of the carrier member 12 may be provided with a decoratively dull or bright electro-deposited layer, such as a metal hard chrome layer.

Furthermore, in accordance with the present invention, the metallic carrier member should be a web having a thickness which is not less than 100 micrometers.

While specific embodiments of the invention have been shown and described in detail to illustrate the application of the inventive principles, it will be understood that the invention may be embodied otherwise without departing from such principles.

What is claimed is:

1. A process for the manufacture of paper webs for use in the production of laminate materials having embossed surfaces comprising the steps of feeding together a pair of resin impregnated paper webs, feeding to between said webs a metallic carrier member consisting of a hard wear resistant material having two opposed surfaces with an embossing pattern on each of said opposed surfaces to form a layered structure consisting of said carrier member with said webs being applied one against each of said opposed surfaces thereof, compressing said layered structure by applying pressure on each of said webs from both sides of said carrier member, heating said layered structure, subsequently cooling said layered structure, roughening the outer sides of said paper webs and separating said paper webs from said carrier member.

2. A process according to claim 1, wherein said carrier member comprises a metallic embossing web not less than 100 micrometers in thickness.

3. A process according to claim 1, wherein said carrier member is unwound from a supply roll.

4. A process according to claim 1, wherein said paper webs are layered so that their backs lie on an area of a pressing device and so that their top surfaces are on one side each of said carrier member.

5. A process according to claim 1, wherein higher process temperatures are utilized with a layered structure consisting of two laminate webs having a carrier member lying therebetween which are bonded front-to-front along the carrier member at a press edge devoid of an embossing pattern.

6. Apparatus for the manufacture of laminate materials having embossed surfaces comprising an unwinding unit including supply rolls for feeding together a pair of resin impregnated paper webs, means including carrier rolls for feeding to between said webs a metallic carrier member having a hard wear resistant surface with an embossing pattern thereon to form a layered structure consisting of said carrier member with said webs on opposite sides thereof, a laminating machine for compressing said layered structure while applying pressure and heat thereto, a spray water cooling device for cooling said layered structure after passage thereof through said laminating machine, a grinding station located downstream of said spray water cooling device for roughening the outer sides of said paper webs, a winding station including rolls for winding thereon said paper webs after passage through said grinding station, a panel cutting station for cutting said paper webs to a desired size, a control cabinet including a data viewer for enabling control of said apparatus and for viewing information indicative of the operating parameters thereof, a carrier member takeup coil for having wound thereon said carrier member after removal thereof from between said webs, said carrier rolls and said takeup coil being arranged to permit forward and backward spooling of said carrier member to enable selective positioning thereof relative to said paper webs.

7. Apparatus according to claim 6, wherein said carrier member is formed with an embossed texture on at least one side thereof.

8. Apparatus according to claim 7, wherein said carrier member is formed with an embossed texture on both sides thereof.

9. Apparatus according to claim 6, wherein said carrier member consists of a textured material comprising at least one of duroplastic, thermosettable laminate with or without a metallic surface, textured metal foil and textured metal strip.

10. Apparatus according to claim 6, wherein said carrier member is formed with a plurality of different motifs for forming an embossed surface, the sum of the single lengths of each of said motifs on one side of said carrier member corresponding exactly to the total length thereof.

11. Apparatus according to claim 6, wherein said carrier member is produced by pressing a fiber matrix with duroplastic, chemically or heat hardening binder between negatively embossed elements comprising one of parchment, vat paper, glass fiber mat, wire mesh and textile fabric and wherein after hardening is protected against wear by copper-plating and decorative hard chrome plating for plastic surfaces.

12. Apparatus according to claim 6, wherein said carrier member consists of an accompanying web inserted between a pair of metallic layers comprising one of parchment, vat paper, glass fiber mat, wire mesh, textile fabric and a metallic strip having an adhesive layer with substances strewn thereon and of a metallic cover layer for reproduction of fabric structures or elevations of the substances, the individual layers being joined together with a thermostable duroplast adhesive layer.

13. Apparatus according to claim 6, wherein said carrier member consists of two metallic layers joined together with a thermostable duroplast adhesive layer and is run as a foil-adhesive packet having placed on accompanying webs comprising one of parchment, vat paper, glass fiber mat, wire mesh and textile fabric into the reaction zone of a double belt press wherein the metal foil surface is embossed through the accompanying web against the adhesive film and the adhesive film is hardened by heating.

14. Apparatus according to claim 6 comprising a carrier member formed by one of grinding, sand-jetting, shot-peening, thermal spraying of a metallic alloy, copying of a patterned roller or drum under pressure, etching, and multi-step etching.

15. Apparatus according to claim 6, wherein said carrier member consists of a metal foil electro-deposited on a structured substrate which is detached from the substrate after the required layered thickness has been reached.

16. Apparatus according to claim 6, wherein said carrier member is provided with a decorative electro-deposited surface for protection against wear.

17. Apparatus according to claim 16, wherein said electro-deposited surface comprises a metal hard-chrome layer.

18. Apparatus for the manufacture of materials having embossed surfaces comprising:
means for feeding together in one direction a pair of resin impregnated paper webs;
means for feeding in said one direction to between said pair of webs a metallic carrier member consisting of a hard wear resistant material having a pair of opposed surfaces with an embossing pattern on each of said opposed surfaces to form a layered structure consisting of said carrier member with said webs one on each of said opposed surfaces thereof;

means for impressing said embossing pattern on said paper webs including pressing means for compressing said layered structure by applying pressure against both said paper webs from both sides of said carrier member;

means for separating said paper webs from said carrier member; and means for moving said carrier member in said one direction and in a direction opposite thereto between said paper webs while said paper webs are separated therefrom and while said pressing means is not compressing said layered structure formed thereof in order to enable selective placement of said carrier member and of the embossing patterns thereon relative to said paper webs.

19. Apparatus according to claim 18, wherein said carrier member has different embossing patterns on each of said opposed surfaces thereof.

20. Apparatus according to claim 8, wherein said carrier member is formed with a different embossed texture on each of said sides thereof.

* * * * *